United States Patent [19]
Wilson et al.

[11] Patent Number: 5,929,190
[45] Date of Patent: Jul. 27, 1999

[54] (2-CYANOACETAMIDO) REACTIVE POLYURETHANES

[75] Inventors: John C. Wilson, Rochester; William B. Vreeland, Webster, both of N.Y.

[73] Assignee: Eastman Kodak Company, Rochester, N.Y.

[21] Appl. No.: 09/022,082

[22] Filed: Feb. 11, 1998

Related U.S. Application Data

[63] Continuation-in-part of application No. 08/904,112, Jul. 31, 1997, abandoned.
[51] Int. Cl.$^6$ .................................................. C08G 18/30
[52] U.S. Cl. ............................................ 528/85; 528/49
[58] Field of Search ........................................ 528/49, 85

[56] References Cited

U.S. PATENT DOCUMENTS

| | | | |
|---|---|---|---|
| 3,334,097 | 8/1967 | Santilli et al. | 260/247.5 |
| 4,879,365 | 11/1989 | Petschke et al. | 528/49 |
| 5,552,496 | 9/1996 | Vogt-Birnbrich et al. | 525/440 |

OTHER PUBLICATIONS

Moszner et al. in Polymer Bulletin, vol. 33, pp. 43–49 (1994), Reaction behaviour of monomeric β–ketoesters.

Clauss et al., in Justus Liebigs Ann. Chem. (1974) pp. 561–592, Reaktionen der Aldehyde und Ketone mit Chlor– und Fluorsulfonylisocyanat.

Santilli and Osdene in Journal of Organic Chemistry (1964), vol. 29, pp. 2066–2068, 8,9,10,11–Tetrahydro–12H–benzo[5,6]quinoxalino[2,3–E][1,4]diazepin–12–ones. Examples Of A New Heterocyclic Ring System.

Taub and Petschke in Modern Paint and Coatings (Jul. 1989), 79(7), pp. 41–48, Polyfunctional Isocyanate–Oxazolidine Resins: Useful In Clear Topcoat Refinishing.

Tilak, Ayyangar & Rao in Indian Journal of Chemistry, vol.23B, 18–23 (1984), Synthesis of Heterocyclic Compounds: Part XXV$^a$ —Synthesis & Reactions of 6–Cyano–2,3–dihydro–7–methyl–oxazolo[3,2–a]pyrid–5(H)–one.

Shulze in Journal für praktische Chemie, Band 311 (1969) Heft 3, S. 353–528, Reaktionen von Cyanacetylamino–Verbindungen mit p–Nitroso–N.N–bis–(β–chloräthyl)–anilin und p–Nitroso–N,N–bis(β–hydroxyäthyl)–anilin.

*Primary Examiner*—Rachel Gorr
*Attorney, Agent, or Firm*—Doreen M. Wells

[57] ABSTRACT

Polyurethanes with pendant reactive 2-cyanoacetamide moieties derived from a reaction mixture of: a) at least one 2-cyanoacetamido-substituted compound selected from 2-cyanoacetamido-substituted glycol, 2-cyanoacetamido-substituted aromatic diol, aliphatic or aromatic 2-cyanoacetamido-substituted polyol, 2-cyanoacetamido-substituted monohydroxy alcohol or phenol; and b) at least one diisocyanate or polyisocyanate. (2-Cyanoacetamido) alcohols with a hydroxy functionality other than 2 lead to polyurethanes with terminal 2-cyanoacetamido moieties and/or branch sites with 2-cyanoacetamido moieties. The polyurethanes are useful for coatings and in industries where polymers with enhanced physical properties are sought.

13 Claims, No Drawings

(2-CYANOACETAMIDO) REACTIVE POLYURETHANES

CROSS REFERENCE TO RELATED APPLICATIONS

This application is a continuation-in-part of U.S. Ser. No. 08/904,112, filed Jul. 31, 1997 of Wilson and Vreeland, titled "LINEAR (2-CYANOACETAMIDO) REACTIVE POLYURETHANES", now abandoned.

This application is also related to the following commonly owned U.S. Ser. No. 08/903,617, of Wilson and Vreeland, titled "CROSS-LINKED LINEAR (2-CYANOACETAMIDO) REACTIVE POLYURETHANES" and U.S. Ser. No. 08/903,619, of Wilson and Vreeland, titled "CROSS-LINKED LINEAR (2-CYANOACETAMIDO) REACTIVE POLYURETHANES WITH INCREASED NETWORK DENSITY", now abandoned in favor of continuation-in-part U.S. Ser. No. 09/032,088 filed on Feb. 11, 1998.

FIELD OF THE INVENTION

This invention relates to novel polyurethanes and methods of making such polyurethanes.

BACKGROUND OF THE INVENTION

The preparation of different types of reactive polyurethanes continues to be of interest in the coatings and other industries and in general for diverse applications where polymers with enhanced physical properties are sought.

There are numerous reports describing the reaction of isocyanates with reactive methylene compounds. For example, Moszner et al. in Polymer Bulletin, Vol. 33, pp. 43–49 (1994), *Reaction Behaviour of Monomeric β-Ketoesters,* reported the reaction of 2-acetoacetoxyethyl methacrylate (AAEM) with aromatic isocyanates to give adducts formed involving the reactive methylene moiety of AAEM. Reaction with aliphatic isocyanates failed.

Chlorosulfonyl isocyanate, reported to be the most reactive isocyanate known, is an electrophile which has been reported to react with the reactive methylene moiety of acetoacetic esters to give amides (Clauss et al., in Justus Liebigs Ann. Chem. (1974) pp. 561–592, *Reaktionen der Aldehyde und Ketone mit Chlor- und Fluorsulfonylisocyanat*).

Applicants are aware of no references which teach the present invention.

SUMMARY OF THE INVENTION

It has been unexpectedly found that (2-cyanoacetamido)-substituted glycols can be reacted with diisocyanates such as 4,4'-methylenebis(cyclohexyl isocyanate), isophorone diisocyanate and tolylene-2,4-diisocyanate to selectively give linear polyurethanes. That linear polyurethanes are formed suggests that the reactive methylene moiety of the 2-cyanoacetamido pendant group does not participate in the polymerization process but remains free to react with a variety of electrophiles to provide other linear, branched or cross-linked polymers offering a range of properties (e.g., a balance of hardness and flexibility) which can be useful in most coating applications. For example, the polyurethanes of the invention may subsequently be reacted with electrophiles such as aldehydes and epoxides with base catalysis to give polyurethanes with increased network density. It is an advantage that the present polyurethanes with reactive 2-cyanoacetamide moieties can be prepared as storage-stable prepolymers and later reacted with selected electrophiles to produce polyurethanes with selected properties.

The present invention provides polyurethanes with pendant reactive 2-cyanoacetamide moieties derived from a reaction mixture of: a) at least one 2-cyanoacetamido-substituted compound selected from 2-cyanoacetamido-substituted glycol, 2-cyanoacetamido-substituted aromatic diol, aliphatic or aromatic 2-cyanoacetamido-substituted polyol, 2-cyanoacetamido-substituted monohydroxy alcohol or phenol; and b) at least one diisocyanate or polyisocyanate.

DETAILED DESCRIPTION OF THE INVENTION

In general, (2-cyanoacetamido)-substituted glycols, aromatic diols, monohydroxy alcohol or phenol, aliphatic or aromatic polyols, are reacted with diisocyanates or polyisocyanates to provide the polyurethanes of the invention.

As used herein, the term "linear polyurethane" means a polyurethane derived from difunctional monomers (e.g., diols, diisocyanate, diamines) containing 2-cyanoacetamido functional groups where the reactive methylene moiety of the 2-cyanoacetamido functional group has not reacted to any appreciable extent with isocyanate functional groups. For example, the reaction of 2-(2-cyanoacetamido)-2-ethyl-1,3-propanediol with a diisocyanate leads to a linear polyurethane without any appreciable degree of branching and/or crosslinking when only the hydroxyl groups of the glycol and not the reactive methylene moiety react with the isocyanate functional groups of the diisocyanate.

As used herein, the term "polyurethane" describes the products formed from the reaction of diisocyanates with aliphatic and aromatic diols (urethanes), aliphatic and aromatic diamines (ureas), as well as the reaction products of isocyanates with formed urethane and urea bonds (allophonates and biurets). Furthermore, isocyanate dimers (uretidinediones) and trimers (isocyanurates), aliphatic and aromatic alcohols or phenols, aliphatic and aromatic polyols or polyamines may be present in the "polyurethane".

(2-Cyanoacetamido)-substituted glycols can be readily prepared, for example, as described by Santilli and Osdene in Journal of Organic Chemistry (1964), Vol. 29, pp. 2066–2068; in U.S. Pat. No. 3,334,097; and as exemplified in the first Example M1 below.

The following table lists exemplary glycol monomers.

TABLE I (2-Cyanoacetamido)-substituted Glycols

| Example | Glycol | Yield % | mp ° C. |
|---|---|---|---|
| M1 | 2-(2-cyanoacetamido)-2-methyl-1,3-propanediol | 87.9 | 131.5–3.5 |
| M2 | 2-(2-cyanoacetamido)-2-ethyl-1,3-propanediol | 29.6 | 63.5–5.5 |
| M3 | 2-(2-cyanoacetamido)-1,3-propanediol | 73.3 | 85–6.5 |
| M4 | 3-(2-cyanoacetamido)-1,2-propanediol | 78.3 | 79.5–80.5 |

Other co-monomers which may be useful in the present invention include low molecular weight glycols such as ethylene glycol and 1,4-butanediol, aromatic diols such as bisphenol A, triol crosslinking agents such as glycerol and trimethylolpropane, high molecular weight polyether polyols such as poly(ethylene glycol), poly(propylene glycol) and poly(tetramethylene glycol), hydroxy terminated polyesters such as poly(ethylene adipate), poly-(2,2'- oxydiethylene adipate) and polycaprolactonediol, aromatic diamines such as ring substituted 4,4'-diaminodiphenylmethanes and m-phenylenediamines, substituted and unsubstituted aliphatic diamines such as ethylene diamine, 2-methyl-1,5-pentanediamine and hexamethylene diamine, diisocyanates such as tolylene diisocyanate (TDI), methylene di-p-diphenylene diisocyanate (MDI), 4,4'-methylenebis(cyclohexyl isocyanate) (RMDI or $H_{12}$MDI), isophorone diisocyanate (IPDI) and 1,6-hexamethylene diisocyanate (HDI) and higher functional polyisocyanates such as 4,4',4"-triisocyanatotriphenylmethane.

The following equation is representative of the claimed synthesis of linear polyurethanes from (2-cyanoacetamido)-substituted glycols and diisocyanates:

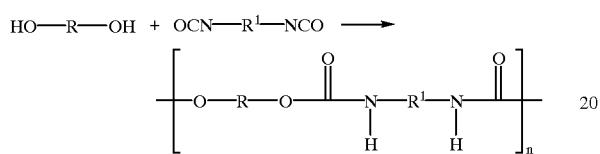

where $R^1$=alkylene, arylene, alkylenediarylene or arylenedialkylene; and

R may be

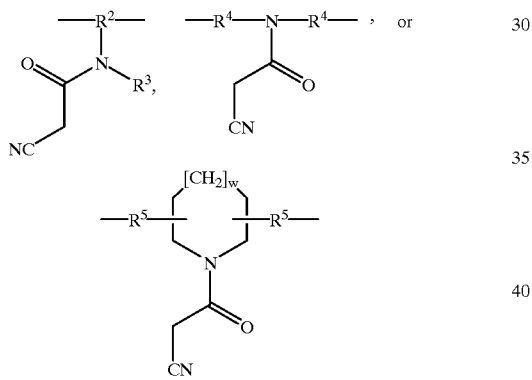

where $R^2$=substituted or unsubstituted aliphatic triyl or aromatic triyl $R^3$=H or alkyl $R^4$=alkylene and may be the same or different $R^5$=alkylene or a covalent bond and may be the same or different w=0,1 or 2

Representative 2-cyanoacetamido-substituted glycols or aromatic diols useful in the preparation of the polyurethanes of the invention include:

2-(2-cyanoacetamido)-2-butyl-1,3-propanediol
2-(2-cyanoacetamido)-2-isopropyl-1,3-propanediol
2-(2-cyanoacetamido)-2-pentyl-1,3-propanediol
2-(2-cyanoacetamido)-2-propyl-1,3-propanediol
2-(2-cyanoacetamido)-2-ethoxymethyl-1,3-propanediol
2-(2-cyanoacetamido)-2-phenyl-1,3-propanediol
2-(2-cyanoacetamido)methyl-1,3-propanediol
2-[3-(2-cyanoacetamido)propyl]-1,3-propanediol
2-[4-(2-cyanoacetamido)phenyl]-1,3-propanediol
N,N-bis(2-hydroxyethyl)-2-cyanoacetamide
N,N-bis(2-hydroxypropyl)-2-cyanoacetamide
6-(2-cyanoacetamido)-1,2-hexanediol
3-(2-cyanoacetamido)-1,2-octadecanediol
2-(2-cyanoacetamido)-1,3-octadecanediol
2-(2-cyanoacetamido)-8-methyl-1,3-octadecanediol
2-(2-cyanoacetamido)-9-methyl-1,3-octadecanediol
2-(2-cyanoacetamido)-16-methyl-1,3-octadecanediol
4-(2-cyanoacetamido)-1,3-cyclohexanediol
3-(2-cyanoacetamido)-1,2-cyclohexanediol
N-(2-cyanoacetyl)-2,6-piperidinedimethanol
N-(2-cyanoacetyl)-3,4-piperidinediol
N-(2-cyanoacetyl)-3,5-piperidinediol
4-(2-cyanoacetamido)-1,3-benzenediol
5-(2-cyanoacetamido)-1,3-benzenediol
2-(2-cyanoacetamido)-1,4-benzenediol
2-(2-cyanoacetamido)-1,4-benzenedimethanol
2-(2-cyanoacetamido)-1,5-naphthalenedimethanol
2-(2-cyanoacetamido)-1,7-naphthalenedimethanol
2-(2-cyanoacetamido)-1,8-naphthalenedimethanol
5-(2-cyanoacetamido)-1,4-naphthalenedimethanol.
Representative of

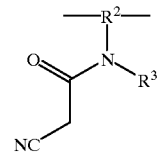

are the following:

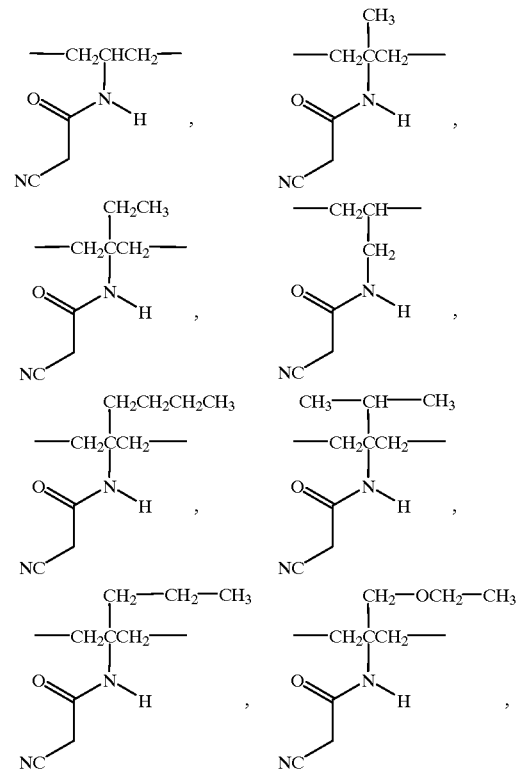

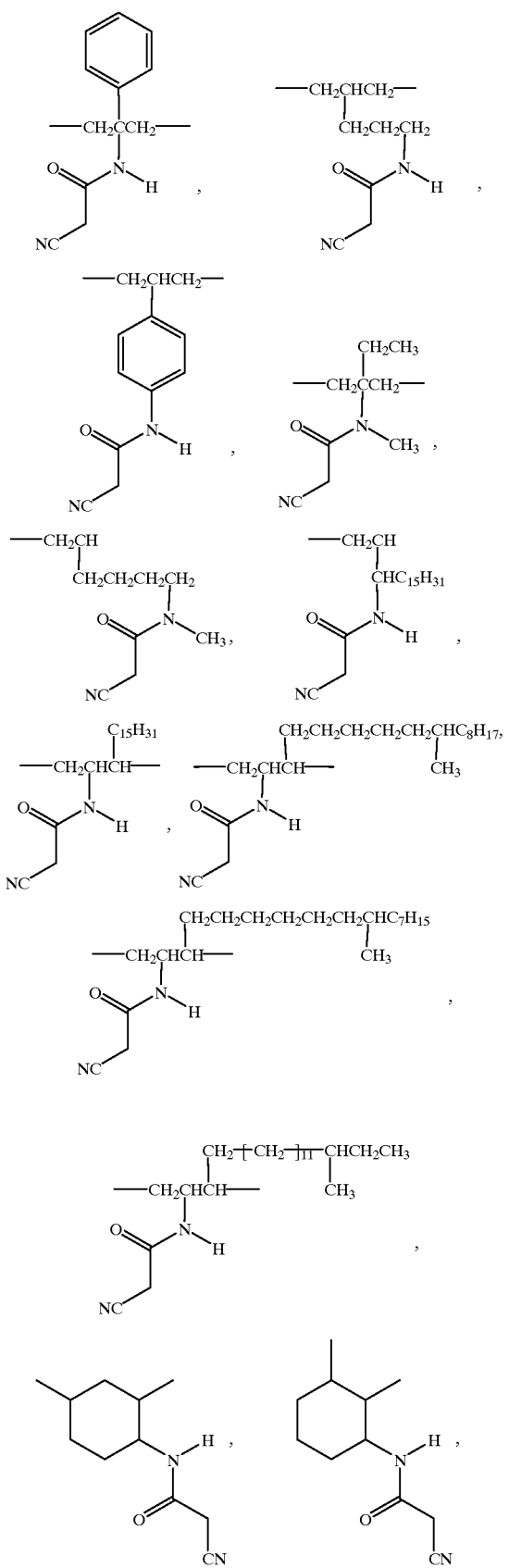
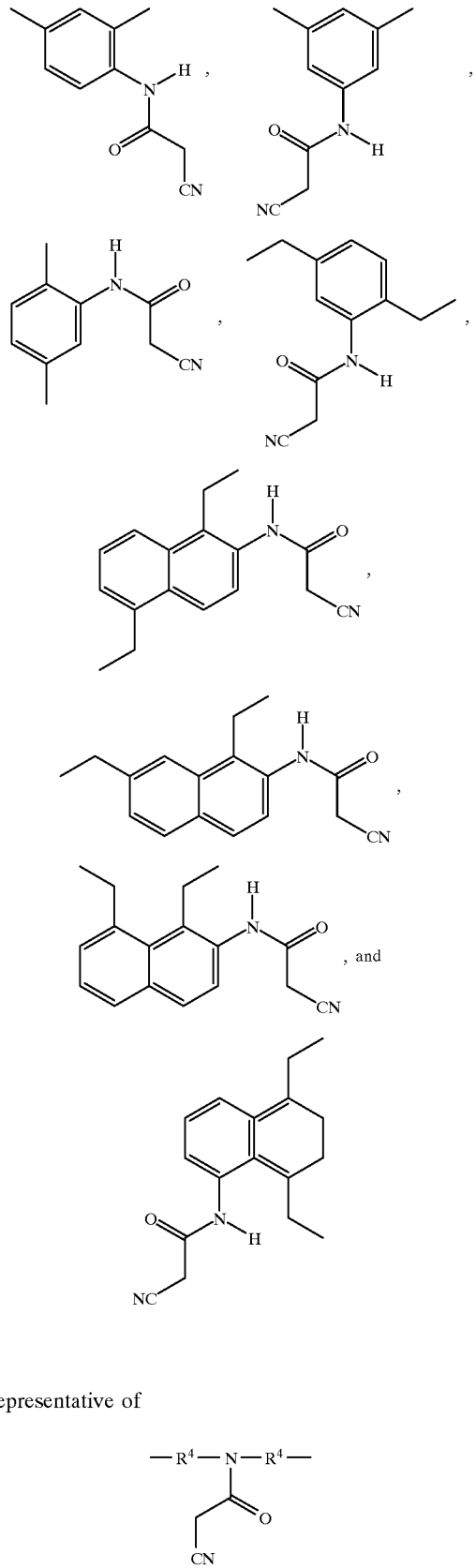
Representative of are the following:

, and

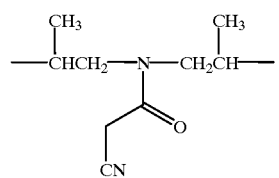

Representative of

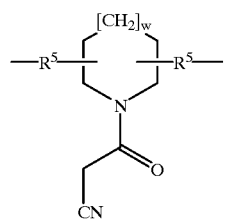

are the following:

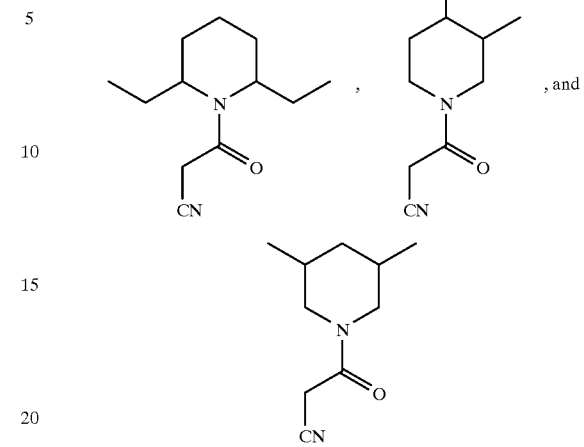

Properties and general formula of some of the claimed polyurethanes are listed in the following table:

TABLE II $$\left[ \begin{array}{c} O-R^2-O-\overset{O}{\underset{NC}{\overset{\|}{C}}}-\overset{}{\underset{H}{N}}-R^1-\overset{}{\underset{H}{N}}-\overset{O}{\overset{\|}{C}} \\ \overset{O}{\underset{NC}{\overset{\|}{C}}}\overset{}{\underset{H}{N}} \end{array} \right]_n$$

| Polyurethane | $\begin{array}{c} O-R^2-O \\ | \\ N \end{array}$ | $R^{1a}$ | Solvent[b] | IV(DMF) | Tg | Mn[c] | Mw[c] | Mw/Mn[c] |
|---|---|---|---|---|---|---|---|---|
| #1 | —CH₂CHCH₂—<br>\|<br># | RM | DMF | 0.71 | 110 | 29,600 | 79,000 | 2.67 |
| #2 | CH₃<br>\|<br>—CH₂CCH₂—<br>\|<br># | RM | DMF | 0.30 | 99 | 14,800 | 23,800 | 1.61 |
| #3 | CH₃<br>\|<br>—CH₂CCH₂—<br>\|<br># | I | DMF | 0.21 | 100 | 6,180 | 14,500 | 2.35 |

TABLE II-continued $$\left[ -O-R^2-O-\overset{O}{\underset{}{C}}-\underset{H}{N}-R^1-\underset{H}{N}-\overset{O}{\underset{}{C}}- \right]_n$$

with side chain: $O=C-N(H)-CH_2-CN$ attached to $R^2$

| Polyurethane | $O-R^2-O$ / N | $R^{1a}$ | Solvent[b] | IV(DMF) | Tg | Mn[c] | Mw[c] | Mw/Mn[c] |
|---|---|---|---|---|---|---|---|---|
| #4 | —CH₂CCH₂— with CH₃ and # | T | DMF | 0.31 | 109 | 10,300 | 26,400 | 2.56 |
| #5 | —CH₂CCH₂— with C₂H₅ and # | RM | THF | — | — | 18,200 | 36,500 | 2.01 |
| #6 | —CH₂CCH₂— with C₂H₅ and # | I | THF | — | — | 7,450 | 17,700 | 2.38 |
| #7 | —CH₂CCH₂— with C₂H₅ and # | T | THF | — | — | 13,900 | 30,000 | 2.16 |
| #8 | —CHCH₂— with # | RM | DMF | 0.38 | 105 | 17,800 | 34,700 | 1.95 |

[a]=

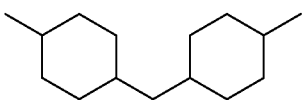

RM

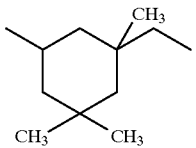

I

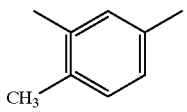

T

[b]= polymerization solvent
[c]= PEO equivalent molecular weight
IV = inherent viscosity Besides the (2-cyanoacetamido)-containing monomers used to prepare the polymers of the invention, additional comonomers of diverse structure and functionality commonly used in the art may be added to prepare polymers with a wide range of physical properties. Representative materials include mono-di- and polyfunctional alcohols, phenols, aliphatic amines, aromatic amines, aliphatic isocyanates and aromatic isocyanates.

The following equation illustrates the use of hydroxy-terminated polymers to give polyurethanes of the invention:

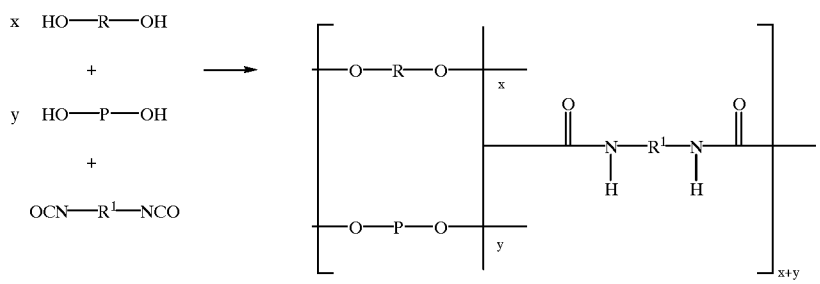

where

R and $R^1$ are as defined above; and

HO—P—OH = hydroxy terminated polymer; and x and y represent mole percent whose sum=100

Properties of polyurethanes derived from 2-(2-cyanoacetamido)-2-ethyl-1,3-propanediol, poly[tetramethylene glycol] and 4,4'-methylenebis(cyclohexyl isocyanate) (RMDI) are listed in the following Table III:

TABLE III

| Polyurethane | PTMG$^a$ | n | y$^c$ | x$^c$ | Mn$^b$ | Mw$^b$ | Mw/Mn |
|---|---|---|---|---|---|---|---|
| #9 | 90 | 1.00 | 50 | 50 | 14,700 | 34,000 | 2.31 |
| #10 | 250 | 3.22 | 50 | 50 | 12,000 | 25,400 | 2.12 |
| #11 | 650 | 8.76 | 50 | 50 | 17,900 | 42,600 | 2.38 |
| #12 | 1000 | 13.62 | 25 | 75 | 13,000 | 27,000 | 2.08 |
| #13 | 1000 | 13.62 | 50 | 50 | 15,200 | 29,700 | 1.95 |

TABLE III-continued

| #14 | 2000 | 27.49 | 50 | 50 | 14,700 | 32,900 | 2.24 |
|---|---|---|---|---|---|---|---|
| #15 | 2900 | 39.97 | 50 | 50 | 15,000 | 30,600 | 2.04 |

$^a$ = PTMG molecular weight
$^b$ = PEO equivalent molecular weight
$^c$ = mole percent
n = average repeat unit value for PTMG and polymerization solvent = THF In still another embodiment of the invention, (2-cyanoacetamido)-containing monomers may have hydroxyl functionality other than with a value of 2. For example, monohydroxy (2-cyanoacetamides), such as, N-(2-hydroxyethyl)-2-cyanoacetamide (A) may be employed to give polyurethanes with (2-cyanoacet-amido)-terminal groups. Furthermore, trihydroxy (2-cyanoacetamides) with a hydroxy functionality of 3, such as 2-(2-cyanoacetamido)-2-hydroxymethyl-1,3-propanediol (B), may be used to give branched and crosslinked polyurethanes.

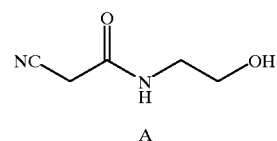

Example M6

A

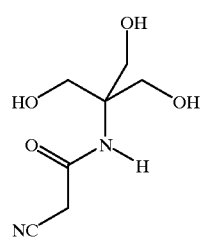

Example M7

B

Branched and/or crosslinked polyurethanes may also be prepared by introducing polyols, polyamines or polyisocyanates with a functionality greater than 2 into the monomer feed. In addition, the use of excess diisocyanate in the monomer feed can be used to provide crosslinked polyurethanes.

In another embodiment of the invention, water dispersible (2-cyanoacetamido)-containing polyurethanes may be prepared by incorporation of the triethylammonium salt of dimethylolpropionic acid.

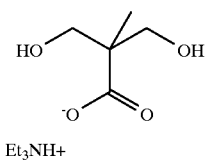
Et₃NH+

Polyurethanes may also be prepared by the inclusion of aromatic and aliphatic diamines in the monomer feed. The following equation illustrates the synthesis of polyurethanes from 2-cyanoacetamido glycols, hydroxy terminated polymers, diisocyanates and diamines:

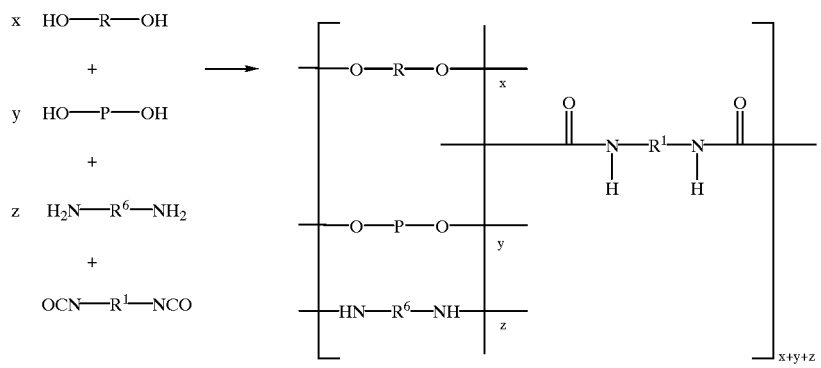

where
R and $R^1$ are as defined above;
HO—P—OH=hydroxy terminated polymer;
$R^6$ =alkylene, arylene, alkylenediarylene or arylenedialkylene;
x, y and z=mole percent whose sum=100

Preparative methods may also vary widely. For example, both one shot and prepolymer methods of preparation as well as solution, emulsion/dispersion and bulk synthesis procedures may be employed. One shot preparation of polyurethanes is the process of mixing all of the formulation components at the same time. Prepolymer preparation is the process of reacting polyol with excess diisocyanate to give a prepolymer which is subsequently chain extended by the addition of polyol or polyamine chain extenders. Variations in the stoichiometry of reactants which can influence allophonate and biuret formation are also considered to fall within the scope of the invention.

The polyurethanes of the invention contain pendant reactive methylene moieties which are known to undergo base catalyzed reactions with a variety of electrophilic reagents such as aldehydes, ketones, imines, activated olefins, alkyl halides and epoxides. The polyurethanes may be crosslinked with aldehydes and epoxides in the presence of base. The aldehyde can be added or generated in situ.

For example, the polyurethanes may be cross-linked with added aldehyde:

Crosslinking of 2-(2-Cyanoacetamido)-2-alkyl-1, 3-propanediol Polyurethanes with Butyraldehyde

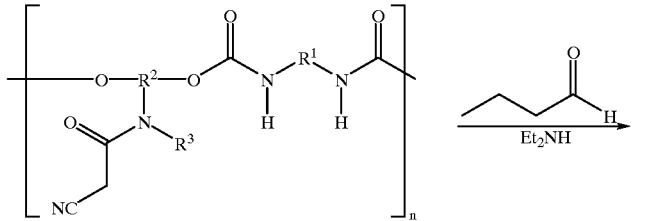

Crosslinked Polymer

Conditions- 25° C., 10% (wt/vol)
[CNCH₂CO]/[CHO] = 2
[Et₂NH]/[CNCH₂CO] = 1

The following table shows gel times determined for solutions of various polyurethanes of the invention in DMF or THF on mixing with butyraldehyde and diethylamine catalyst at 25° C.

TABLE IV

| R¹ | | Solvent | Gel Time min |
|---|---|---|---|
| RM | CH₂C(CH₃)(—)CH₂— | DMF | 1.67 |
| I | CH₂C(CH₃)(—)CH₂— | DMF | 1.75 |
| T | CH₂C(CH₃)(—)CH₂— | DMF | instantly |
| RM | CH₂C(C₂H₅)(—)CH₂— | THF | 6.25 |

TABLE IV-continued

| R¹ | | Solvent | Gel Time min |
|---|---|---|---|
| I | CH₂C(C₂H₅)(—)CH₂— | THF | 18.50 |
| T | CH₂C(C₂H₅)(—)CH₂— | THF | 2.08 |

Moisture cured polyurethanes may be prepared by copolymerization of (2-cyanoacetamido)-substituted glycols with 3-oxazolidineethanols, and hydroxy terminated polymers and diisocyanates. The oxazolidine-terminated polyurethanes thus prepared are believed to hydrolyze to aldehyde and secondary amine which subsequently lead to crosslinking of the resultant hydrolyzed polyurethane. The following equation is illustrative of the process:

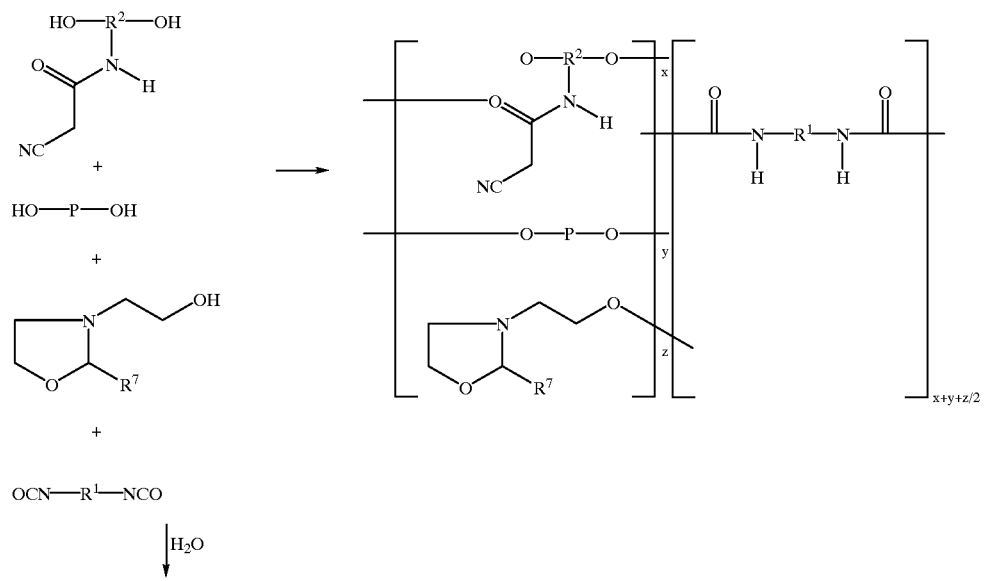

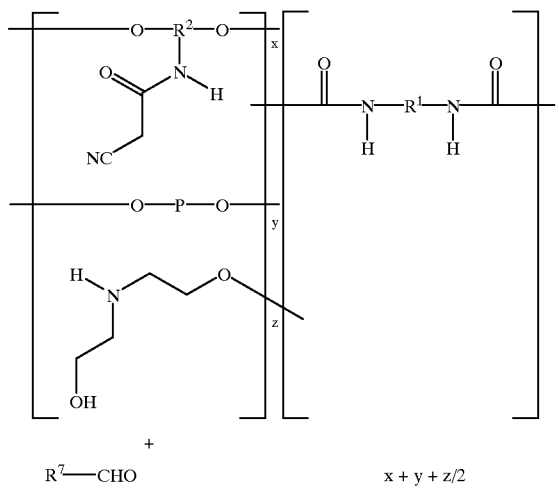

$$R^7-CHO \qquad x + y + z/2$$

where $R^1$, $R^2$ and HO—P—OH are as defined above;

$R^7$=H or alkyl; and x+y+z/2 are mole percent whose sum=100

It has also been found that unbound 3-oxazolidineethanols may be used as a source aldehyde and secondary amine for the moisture cure of (2-cyanoacetamido)-containing polyurethanes.

Taub and Petschke, U.S. Pat. No. 4,879,365, reported the preparation of storage-stable polyurethanes from polyfunctional isocyanate prepolymers with a deficiency of N-(2-hydroxyethyl)oxazolidines. The resultant polyurethanes, when applied to substrates, hydrolyze to aminoalcohols and aldehydes. The aminoalcohols formed react with excess isocyanate to increase network density of the polyurethanes. However, the reaction of generated aldehydes with reactive methylene moieties is not disclosed.

Films cast from solutions of polyurethanes derived from 2-(2-cyanoacetamido)-2-ethyl-1,3-propanediol, 4,4'-methylenebis(cyclohexyl isocyanate) and poly(tetramethylene glycol) together with Bisphenol A/epichlorohydrin epoxy resin with 2-phenyl-2-imidazoline catalyst were cured and rendered insoluble.

Preparation of Monomers

M1 2-(2-Cyanoacetamido)-2-methyl-1,3-propanediol

A mixture of 52.57 g (0.50 mol) of 2-amino-2-methyl-1,3-propanediol, 49.55 g (0.50 mol) of methyl cyanoacetate and 100 ml of acetonitrile was heated at reflux for 1 hr and cooled. Solid crystallized and was collected, washed with acetonitrile and dried. The yield of product was 75.65 g (87.9% of theory); mp=131.5–3.5° C. (rep$^a$mp=130.5–1.5° C.)

a) J. Org. Chem., 29, 2066 (1964)

M2 2-(2-Cyanoacetamido)-2-ethyl-1,3-propanediol

A solution of 357.48 g (3.0 mol) of 2-amino-2-ethyl-1,3-propane-diol, 297.27 g (3.0 mol) of methyl cyanoacetate and 600 ml of acetonitrile was heated on a steam bath for 2.5 hrs and cooled. The solution was concentrated to an amber oil which was then dissolved in 1200 ml of ethyl acetate, seeded and stirred. Solid crystallized and was collected, washed with ethyl acetate and dried. The filtrate gave a second crop on standing which was similarly collected, washed and dried. The yield of first crop was 151.1 g; mp=62.5–4.5° C. and of 2nd crop was 33.6 g; mp=62.5–5.5° C. Both crops were combined and recrystallized again from ethyl acetate, collected, washed with ethyl acetate and dried. The yield of product was 165.2 g (29.6% of theory); mp=63.5–5.5° C.

M3 2-(2-Cyanoacetamido)-1,3-propanediol

A mixture of 18.22 g (0.20 mol) of 2-amino-1,3-propanediol, 19.82 g (0.20 mol) of methyl cyanoacetate and 40 ml of acetonitrile was heated on a steam bath for 2 hrs and cooled. The reaction mixture was concentrated to a viscous oil which was treated with warm ethyl acetate, cooled, isolated and treated with ethyl acetate and scratched to crystallize. The solid was collected, recrystallized from ethanol, collected, washed with ethanol and dried. The yield of product was 23.18 g (73.3% of theory); mp=85–6.5° C.

M4 3-(2-Cyanoacetamido)-1,2-propanediol

A mixture of 45.56 g (0.50 mol) of 3-amino-1,2-propanediol, 49.55 g (0.50 mol) of methyl cyanoacetate and 100 ml of acetonitrile was heated on a steam bath for 2.83 hrs and cooled. The reaction mixture was cooled and concentrated. Ethyl acetate was added to the residue which on standing, crystallized. The solid was collected, recrystallized from ethanol, collected, washed with ethanol and dried. The yield of product was 61.9 g (78.3% of theory); mp=79.5–80.5° C.

M5 N,N-Bis(2-hydroxyethyl)-2-cyanoacetamide

A solution of 10.82 g (103 mmol) of diethanolamine, 10.20 g (103 mmol) of methyl cyanoacetate and 20 ml of acetonitrile was heated on a steam bath for 50 minutes and cooled. The reaction mixture was then concentrated to a viscous oil.

M6 N-(2-Hydroxyethyl)-2-cyanoacetamide

Methyl cyanoacetate (49.55 g, 0.50 mol) was added dropwise to 30.55 g (0.50 mol) of ethanolamine. An exothermic reaction ensued requiring the addition of 50 ml of acetonitrile early in the addition. The addition was complete within 5 minutes after which the reaction mixture was stirred for 1.25 hrs and concentrated to a red-brown oil. The oil crystallized after seeding with material which was recrystallized from ethyl acetate. The crystalline material was recrystallized from ethyl acetate with seeding. The solid was collected, washed with ethyl acetate and dried to give 49.75 g (77.66% of theory) of product; mp=56–9° C. (rep$^a$mp= 61–2° C.).

a) Ind. J. Chem., 23B, 18 (1984)

M7 2-(2-Cyanoacetamido)-2-hydroxymethyl-1,3-propanediol

A mixture of 11.30 g (100 mmol) of ethyl cyanoacetate, 8.90 g (73.5 mmol) of tris(hydroxymethyl)aminomethane, 20 ml of ethanol and 10 ml of DMF was heated on a steam bath for 1.25 hrs and cooled. On scratching the flask walls, solid crystallized and was collected, washed with ethanol and dried. The yield of product was 8.74 g; mp=130–2° C. A second recrystallization from ethanol gave 4.6 g of product; mp=131–3° C. (rep$^a$mp=134–5° C.).

a) J. Prakt. Chem., 311, 353 (1969)

Preparation of Polyurethanes

Polymerization of 2-(2-Cyanoacetamido)-2-ethyl-1,3-propanediol and 4,4'-Methylenebis(cyclohexyl isocyanate) [Polyurethane #5]

A solution of 13.12 g (50 mmol) of 4,4'-methylenebis (cyclohexyl isocyanate), 9.31 g (50 mmol) of 2-(2-cyanoacetamido)-2-ethyl-1,3- propanediol, 22.43 g of THF and two drops of dibutyltin dilaurate was heated in a 60° C. bath under nitrogen for 18.75 hrs. The polymerization mixture was diluted with 50 ml of THF and a few drops of water to give a dope determined to contain 25.1% solids.

Polymerization of 3-(2-Cyanocetamido)-1,2-propanediol and 4,4'-Methylenebis(cyclohexyl isocyanate) [Polyurethane #8]

A solution of 7.91 g (50 mmol) of 3-(2-cyanocetamido)-1,2-propanediol, 13.12 g (50 mmol) of 4,4'-methylenebis (cyclohexyl isocyanate), 21.03 g of DMF and 2 drops of dibutyltin dilaurate was heated under nitrogen in a 60° C. bath for 16.5 hrs. The polymerization mixture was diluted with 50 ml of DMF and poured into aqueous methanol. The precipitated polymer was isolated, redissolved in THF and reprecipitated in water. The polymer was isolated and washed and ground up in a high speed blender. The polymer was collected and dried giving 13.44 g.

Polymerization of 2-(2-Cyanoacetamido)-1,3-propanediol and 4,4'-Methylenebis(cyclohexyl isocyanate) (Polyurethane #1)

A solution of 7.91 g (50 mmol) of 2-(2-cyanoacetamido)-1,3-propanediol, 13.12 g (50 mmol) of 4,4'-methylenebis (cyclohexyl isocyanate), 21.03 g of DMF and 2 drops of dibutyltin dilaurate was heated in a 60° C. bath under nitrogen for 16 hrs. The solution was diluted with 50 ml of DMF, heated for another 1 hr to dissolve and cooled. The polymer was precipitated in water, isolated, ground up in water in a high speed blender, isolated and redissolved in THF. The polymer was reprecipitated in water, isolated, ground up in water in a high speed blender, collected and dried. The yield of polymer was 20.82 g.

Copolymerization of 2-(2-Cyanoacetamido)-2-methyl-1,3-propanediol, Poly(propylene glycol-1000), 3,5-Diethyltoluene-2,4/6-diamine and 4,4'-Methylenebis (cyclohexyl isocyanate)

Poly(propylene glycol-1000), 25.00 g (25 mmol), was dried on a steam bath at reduced pressure. To the dried polymer was added 4.30 g (25 mmol) of 2-(2-cyanoacetamido)-2-methyl-1,3-propanediol, 15.74 g (60 mmol) of 4,4'-methylenebis(cyclohexyl isocyanate), 93.64 g of DMF and 5 drops of dibutyltin dilaurate. The resultant solution was stirred in an 80° C. bath under nitrogen for 2 hrs. To this prepolymer was then added 1.78 g (10 mmol) of 3,5-diethyltoluene-2,4/6-diamine (Ethacure-100) and the solution was heated at 80° C. for another 2 hrs and cooled.

Size exclusion chromatography gave poly(ethylene oxide) equivalent molecular weights of:
Mn=5,090
Mw=10,700
Mw/Mn=2.10

Copolymerization of 2-(2-Cyanoacetamido)-2-ethyl-1,3-propanediol, Poly(tetramethylene glycol)-650 and 4,4'-Methylenebis(cyclohexyl isocyanate) (Polyurethane #11)

A solution of 16.25 g (25 mmol) of poly(tetramethylene glycol)-650, 4.66 g (25 mmol) of 2-(2-cyanoacetamido)-2-ethyl-1,3-propanediol, 13.12 g (50 mmol) of 4,4'-methylenebis(cyclohexyl isocyanate), 34.03 g of THF and 2 drops of dibutyltin dilaurate under nitrogen was heated in a 60° C. bath for 21 hrs and cooled. THF (50 ml) was added to give a 30.25% solids dope.

Chain Termination

Copolymerization of N-(2-Hydroxyethyl)-2-cyanoacetamide, Poly(tetramethylene glycol)-1000 and 4,4'-Methylenebis(cyclohexyl isocyanate)

A solution of 45.00 g (45 mmol) of poly(tetramethylene glycol)-1000, 1.28 g (10 mmol) of N-(2-hydroxyethyl)-2-cyanoacetamide, 13.12 g (50 mmol) of 4,4'-methylenebis (cyclohexyl isocyanate), 59.40 g of THF and 2 drops of dibutyltin dilaurate was heated under nitrogen in a 60° C. bath for 21.17 hrs and cooled.

Size exclusion chromatography gave poly(ethylene oxide) equivalent molecular weights of:
Mn=6,300
Mw=12,400
Mw/Mn=1.97

Branching

Polymerization of 2-(2-cyanoacetamido)-2-hydroxymethyl-1,3-propanediol and 4,4'-Methylenebis(cyclohexyl isocyanate)

A solution of 12.59 g (66.9 mmol) of 2-(2-cyanoacetamido)-2-hydroxymethyl-1,3-propanediol, 13.12 g (50 mmol) of 4,4'-methylenebis(cyclohexyl isocyanate), 25.71 g of DMF and 2 drops of dibutyltin dilaurate was heated in a 60° C. bath under nitrogen for 17.17 hrs and cooled.

Size exclusion chromatography gave poly(ethylene oxide) equivalent molecular weights of:
Mn=1,850
Mw=3,920
Mw/Mn=2.12

Crosslinking

Reaction of Polyurethane Derived from 2-(2-Cyanoacetamido)-2-ethyl-1,3-propanediol, Poly (tetramethylene glycol-1000) and 4,4'-Methylenebis (cyclohexyl isocyanate) (Polyurethane #13) with EPON 1001F™

To a solution of 3.33 g (0.623 meq) of a 32 wt % solution of polyurethane derived from 2-(2-cyanoacetamido)-2-ethyl-1,3-propanediol, poly(tetramethylene glycol-1000) and 4,4'-methylenebis(cyclohexyl isocyanate) (#13), 0.29 g (0.537 meq) of EPON 1001F™ and 7.32 g of THF was added 0.07 g of 2-phenyl-2-imidazoline. The resultant solution was coated onto a Teflon™ support and air dried for 1 hr. The film was cured at 117° C. for 30 min and determined to be insoluble in THF.

Reaction of Polyurethane Derived from 2-(2-Cyanoacetamido)-2-ethyl-1,3-propanediol and 4,4'-Methylenebis(cyclohexyl isocyanate) (Polyurethane #5) with EPON 1001F™

A solution of 3.98 g (2.2294 meq) of a 25.1 wt % solution of polyurethane derived from 2-(2-cyanoacetamido)-2-ethyl-1,3-propanediol and 4,4'-methylenebis(cyclohexyl isocyanate) (#5), 6.64 ml of THF and 3 drops of water was prepared to which was added 0.60 g (1.1147 meq) of EPON 1001F™. To the resultant solution was added 0.08 g of 2-phenyl-2-imidazoline. The resultant solution was coated onto a Teflon™ support and air dried. A sample of the dried film could be swollen with THF containing a few drops of water. The remaining film was heated in a 120° C. oven for 30 min and cooled. The resultant film was very tough and insoluble in THF containing a few drops of water.

Reaction of Polyurethane Derived from 2-(2-Cyanoacetamido)-2-ethyl-1,3-propanediol, Poly(tetramethylene glycol-1000) and 4,4'-Methylene-bis(cyclohexyl isocyanate) (Polyurethane #13) with 3-Glycidyloxypropyltrimethoxysilane A solution of 3.06 g (0.5917 meq) of a 32 wt % solution of polyurethane derived from 2-(2-cyanoacetamido)-2-ethyl-1,3-propanediol, poly-(tetramethylene glycol-1000) and 4,4'-methylenebis(cyclohexyl isocyanate) (#13), 0.07 g (0.2958 meq) of 3-glycidyloxypropyltrimethoxysilane, 0.05 g of 2-phenyl-2-imidazoline and 1.94 g of THF was prepared and coated onto a Teflon™ support with a 3 mil coating knife. The coating was air dried and heated in a 117° C. oven for 30 minutes. The resultant film was insoluble in THF.

Reaction of Polyurethane Derived from 2-(2-Cyanoacetamido)-2-methyl-1,3-propanediol and Isophorone Diisocyanate (Polyurethane #3) with Butyraldehyde To a solution of 1.00 g (2.54 meq) of polyurethane derived from 2-(2-cyanoacetamido)-2-methyl-1,3-propanediol and isophorone diisocyanate (#3) in 10 ml of DMF was added 0.091 g (1.27 meq) of butyraldehyde and 0.186 g (2.54 meq) of diethylamine. The resultant solution was agitated and determined to gel after 105 sec.

Crosslinking of Polyurethane Derived from 2-(2-Cyanoacetamido)-2-ethyl-1,3-propanediol and 4,4'-Methylenebis(cyclohexyl isocyanate) (Polyurethane #5) with N-(2-Hydroxyethyl)oxazolidine and Water A solution of 4.08 g (2.42 meq) of polyurethane dope (#5) derived from 2-(2-cyanoacetamido)-2-ethyl- 1,3-propanediol and 4,4'-methylenebis(cyclohexyl isocyanate) (25.1 % solids), 6.77 g of THF and 2 drops of water was prepared. To this solution was added 0.154 g (1.315 meq) of N-(2-hydroxyethyl)oxazolidine. The resultant solution gelled after 64.25 hrs at RT.

Polymerization of 2-(2-Cyanoacetamido)-2-ethyl-1,3-propanediol, Poly(tetramethylene glycol -1000), N-(2-Hydroxyethyl)-2-propyloxazolidine and 4,4'-Methylenebis(cyclohexyl isocyanate)

A solution of 3.185 g (20 mmol) of N-(2-hydroxyethyl)-2-propyloxazolidine, 7.45 g (40 mmol) 2-(2-cyanoacetamido)-2-ethyl-1,3-propanediol, 50.00 g (50 mmol) of poly(tetramethylene glycol -1000), 26.24 g (100 mmol) of 4,4'-methylenebis(cyclohexyl isocyanate) and 86.88 g of THF was prepared in a 60° C. bath under nitrogen. 5 drops of dibutyltin dilaurate were added and the mixture was heated under nitrogen for 21.5 hrs and cooled. The resultant dope gelled on standing for 18 days.

Polymerization of 2-(2-Cyanoacetamido)-2-ethyl-1,3-propanediol, Poly(tetramethylene glycol -1000), N-(2-Hydroxyethyl)-2-isopropyloxazolidine and 4,4'-Methylenebis(cyclohexyl isocyanate)

This polymer derived from N-(2-hydroxyethyl)-2-isopropyloxazolidine and prepared as in the previous example did not gel on standing for 51 days.

Polymerization of 2-(2-Cyanoacetamido)-2-ethyl-1,3-propanediol, Poly(tetramethylene glycol -1000), N-(2-Hydroxyethyl)oxazolidine and 4,4'-Methylenebis(cyclohexyl isocyanate)

This polymer derived from N-(2-hydroxyethyl)oxazolidine and prepared as in the previous example gelled on dilution with THF and attempting to dissolve.

Polymerization of 2-(2-Cyanoacetamido)-2-ethyl-1,3-propanediol, Poly(propylene glycol-1000), Dimethylolpropionic Acid and 4,4'-Methylenebis(cyclohexyl isocyanate)

A solution of 10.00g (10 mmol) of dry poly(propylene glycol-1000), 1.34 g (10 mmol) of dimethylolpropionic acid, 1.86 g (10 mmol) of (2-cyanoacetamido)-2-ethyl-1,3-propanediol, 10.49 g (40 mmol) of 4,4'-methylenebis (cyclohexyl isocyanate) and 7.60 g of NMP was prepared in an 80° C. bath under nitrogen. One drop of dibutyltin dilaurate was added and the reaction mixture was heated at 80° C. for 3.5 hrs and cooled. To this viscous solution was added 1.01 g (10 mmol) of triethylamine and the mixture was stirred in a 60° C. bath for 15 minutes. To this solution was added a solution of 0.60 g (10 mmol) of ethylenediamine in 40 ml of distilled water. This mixture was stirred in a 60° C. bath for 2.25 hrs to give a stable dispersion of polyurethane in water.

The invention has been described in detail with particular reference to certain preferred embodiments thereof, but it will be understood that variations and modifications can be effected within the spirit and scope of the invention.

What is claimed is:

1. Polyurethanes comprising reactive 2-cyanoacetamide moieties, derived from a reaction mixture of: a) at least one 2-cyanoacetamido-substituted compound selected from 2-cyanoacetamido-substituted glycol, 2-cyanoacetamido-substituted aromatic diol, aliphatic or aromatic 2-cyanoacetamido-substituted polyol, 2-cyanoacetamido-substituted monohydroxy alcohol or phenol; with b) at least one diisocyanate or polyisocyanate.

2. The polyurethane of claim 1 wherein the reaction mixture further comprises a non-cyanoacetamido-substituted compound selected from hydroxy-terminated polymer, glycol, aromatic diol, monohydroxy alcohol, monohydroxy phenol, polyfunctional alcohol and phenol.

3. The polyurethane of claim 1 or 2 wherein the reaction mixture further contains at least one of an aliphatic or aromatic diamine, or polyamine.

4. The polyurethane of claim 2 wherein the hydroxy-terminated polymer is selected from hydroxy-terminated polyethers and hydroxy-terminated polyesters.

5. The polyurethane of claim 2 wherein the hydroxy-terminated polymer is selected from poly(tetramethylene glycol), poly(propylene glycol), poly(ethylene glycol), poly(ethylene adipate), and poly(caprolactone).

6. The polyurethane of claim 1 wherein the 2-cyanoacetamido-substituted glycol is selected from 2-(2-cyanoacetamido)-2-ethyl-1,3-propanediol, 3-(2-cyanoacetamido)-1,2-propanediol, 2-(2-cyanoacetamido)-1,3-propanediol, and 2-(2-cyanoacetamido)-2-methyl-1,3-propanediol.

7. The polyurethanes of claim 1 wherein the, 2-cyanoacetamido-substituted monohydroxy alcohol is N-(2-hydroxyethyl)-2-cyanoacetamide and the aliphatic 2-cyanoacetamido-substituted polyol is 2-(2-cyanoacetamido)-2-hydroxymethyl-1,3-propanediol.

8. The polyurethane of claim 1 wherein the diisocyanate is selected from 4,4'-methylenebis(cyclohexyl isocyanate), isophorone diisocyanate, and tolylene-2,4-diisocyanate.

9. A polyurethane of claim 1 represented by the general structural formula:

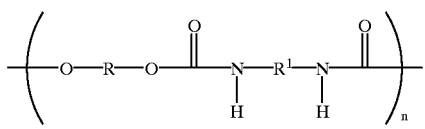

where R=

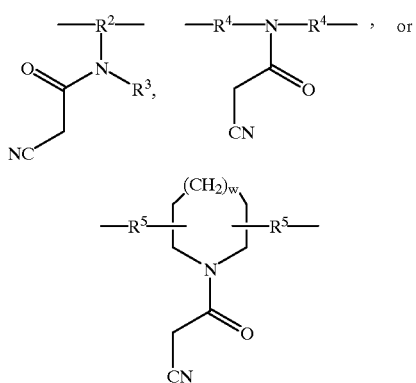

where $R^1$=alkylene, arylene, alkylenediarylene or arylenedialkylene $R^2$=substituted or unsubstituted aliphatic triyl or aromatic triyl;

$R^3$=H or alkyl $R^4$=alkylene and may be the same or different $R^5$=alkylene or a covalent bond and may be the same or different w=0,1 or 2.

10. A method of making the polyurethanes of claim 1 comprising the steps of:

(a) providing at least one 2-cyanoacetamido-substituted compound;

(b) providing at least one diisocyanate or polyisocyanate; and (c) reacting the compounds provided in a) and b).

11. The method of claim 10 wherein all components are made to react at the same time.

12. The method of claim 10 wherein the 2-cyanoacetamido-substituted compound is a polyol.

13. The method of claim 12 wherein the the polyol is made to react with excess diisocyanate to form a prepolymer and the prepolymer is later extended by adding polyol or polyamine chain extenders.

* * * * *